(12) United States Patent
Ueda (10) Patent No.: US 6,672,088 B2
(45) Date of Patent: Jan. 6, 2004

(54) SELF-CONTAINED REGULATING VALVE, AND COMPRESSION TYPE REFRIGERATING MACHINE HAVING THE SAME

(75) Inventor: Kenji Ueda, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/240,276

(22) PCT Filed: Feb. 21, 2001

(86) PCT No.: PCT/JP01/01239

§ 371 (c)(1),
(2), (4) Date: Sep. 30, 2002

(87) PCT Pub. No.: WO02/066872

PCT Pub. Date: Aug. 29, 2002

(65) Prior Publication Data

US 2003/0110786 A1 Jun. 19, 2003

(51) Int. Cl.⁷ .................................................. F25B 41/00
(52) U.S. Cl. ............................. 62/197; 62/468; 251/31
(58) Field of Search .......................... 62/197, 208, 209, 62/468, 228.3, 509, 510; 251/31

(56) References Cited

U.S. PATENT DOCUMENTS

| | | | | |
|---|---|---|---|---|
| 3,149,475 A | * | 9/1964 | Gislason | 62/197 |
| 3,313,121 A | * | 4/1967 | Barbier | 62/197 |
| 3,363,433 A | * | 1/1968 | Barbier | 62/197 |
| 3,402,566 A | * | 9/1968 | Leimbach | 62/197 |
| 3,564,865 A | * | 2/1971 | Spencer et al. | 62/197 |
| 4,669,272 A | * | 6/1987 | Kawai et al. | 62/228.3 |
| 4,788,828 A | * | 12/1988 | Sato | 62/214 |
| 4,850,655 A | * | 7/1989 | Takata et al. | 303/50 |
| 5,934,326 A | * | 8/1999 | Kawase | 137/869 |

FOREIGN PATENT DOCUMENTS

| | | |
|---|---|---|
| JP | 11960/1984 | 1/1984 |
| JP | 60-69460 | 4/1985 |
| JP | 133073/1987 | 8/1987 |
| JP | 64-6587 | 1/1989 |
| JP | 54975/1994 | 7/1994 |
| JP | 7-208636 | 8/1995 |
| JP | 11-51183 | 2/1999 |
| JP | 11-132581 | 5/1999 |
| JP | 11-344265 | 12/1999 |
| JP | 2001-50598 | 2/2001 |

* cited by examiner

Primary Examiner—William E. Tapolcal
Assistant Examiner—Mohammad M. Ali
(74) Attorney, Agent, or Firm—Oblon, Spivak, McClelland, Maier & Neustadt, P.C.

(57) ABSTRACT

A self-operated regulating valve has a spool (13) moving axially in an internal space of a cylindrical valve body (11). One pressure $P_1$ acts on one end surface of the spool (13), and other pressure $P_2$ acts on the other surface of the spool (13). A through-hole (13a) is provided in the spool (13). When a difference between the one pressure $P_1$ and the other pressure $P_2$ exceeds a set value, the through-hole (13a) and pipe lines (12) connected to the valve body (11) communicate to bring the self-operated regulating valve into an open state.

10 Claims, 9 Drawing Sheets

SELF-CONTAINED REGULATING VALVE, AND COMPRESSION TYPE REFRIGERATING MACHINE HAVING THE SAME

TECHNICAL FIELD

This invention relates to a self-operated regulating valve, and a compression refrigerating machine having it.

BACKGROUND ART

Figure 9:
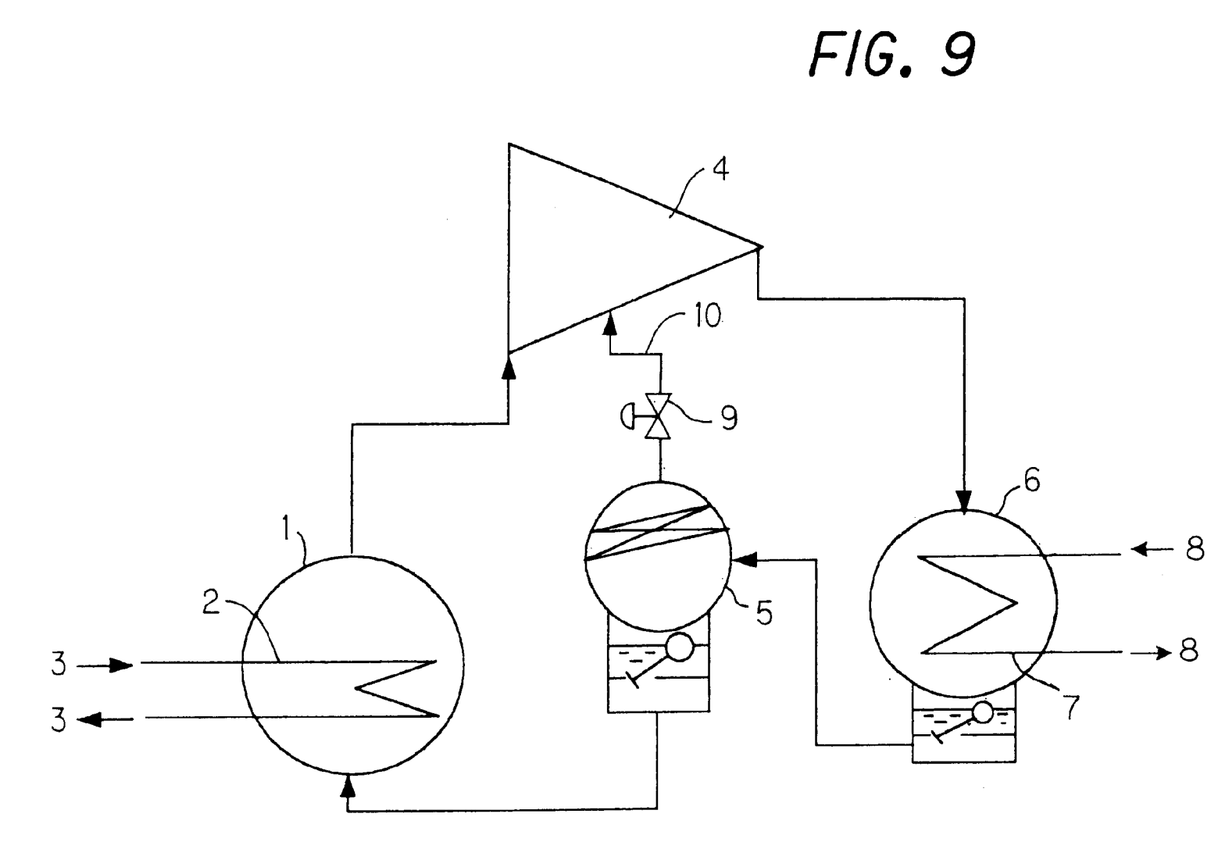
FIG. 9 is a system diagram showing a multistage compression turbo-refrigerating machine according to prior art.

FIG. 9 is a system diagram showing a multistage compression turbo-refrigerating machine according to prior art. As shown in the drawing, in an evaporator 1, a refrigerant liquid (e.g., an organic refrigerant such as a fluorocarbon) is heated with cold water (or brine) 3, flowing in a tube 2, to generate a refrigerant gas. At this time, the cold water 3 is cooled by heat exchange in the evaporator 1, and then delivered to the outside.

A turbo-compressor 4 having two impellers takes in the refrigerant gas evaporated by the evaporator 1, compresses it at two stages by the two impellers rotated by an electric motor (not shown), and discharges a high temperature, high pressure refrigerant gas. A refrigerant gas from an inter-cooler 5 is also taken into the impeller located at the second stage (intermediate stage). In a condenser 6, the high temperature, high pressure refrigerant gas discharged from the turbo-compressor 4 is cooled with cooling water 8, flowing in a tube 7, to condensate and liquefy it. At this time, the cooling water 8 is heated by heat exchange in the condenser 6, and then discharged to the outside. A refrigerant liquid formed by condensation is accumulated at the bottom of the condenser 6.

The inter-cooler 5 evaporates part of a refrigerant supplied from the condenser 6, and allows the resulting refrigerant gas to be taken into the second stage of the turbo-compressor 4 via a pipe line 10. Then, the refrigerant gas is compressed by the second-stage impeller to increase latent heat. That is, in the inter-cooler 5, the refrigerant liquid fed from the condenser 6 is reduced in pressure by a first-stage orifice to an intermediate pressure to expand it, converting it into a refrigerant gas partly. This refrigerant gas, as stated above, is taken into (intermediately sucked into) the second-stage impeller of the turbo-compressor 4. On the other hand, the remaining refrigerant liquid cooled upon evaporation of the refrigerant liquid is further reduced in pressure by a second-stage orifice, and then fed into the evaporator 1. Simultaneously, the inter-cooler 5 has the function of retaining a constant pressure difference between the condenser 6 and the evaporator 1. For this purpose, an intermediate suction valve 9 is put into the pipe line 10 to regulate the flow rate of the refrigerant gas supplied into the turbo-compressor 4 via the pipe line 10. Concretely, the internal pressure $P_1$ of the condenser 6 and the internal pressure $P_2$ of the evaporator 1 are detected, and a pressure switch is activated on condition that a differential pressure, $\Delta P$, between the two pressures exceeds a set value. Upon activation of the pressure switch, an electromagnetic valve or an electric valve is opened. Whereas the valve is closed when the differential pressure is not more than the set value. That is, the above-described intermediate suction valve 9 according to the prior art is constituted as a valve comprising the pressure switch and the electromagnetic or electric valve integrated.

With the turbo-refrigerating machine according to the prior art, a valve comprising a pressure switch and an electromagnetic or electric valve integrated is used as the intermediate suction valve 9 for maintaining the pressure difference between the internal pressure of the evaporator 1 and the internal pressure of the condenser 6 at a constant value. Thus, the intermediate suction valve 9 itself is large in size and expensive. The cost of the turbo-refrigerating machine is boosted accordingly.

With the turbo-refrigerating machine, moreover, there are generally other cases, in addition to the above-mentioned case, in which the flow rate of a fluid, such as a refrigerant, needs to be adjusted in accordance with the differential pressure between one of the pressures, $P_1$, and the other pressure, $P_2$, i.e., $\Delta P$ $(=P_1-P_2)$.

The present invention has been accomplished in light of the above-described prior art, and its object is to provide a self-operated regulating valve, and a compression refrigerating machine having it, which are capable of autonomously opening or closing a valve for flowing a fluid, such as a refrigerant, with the use of a low cost, simple configuration in accordance with a differential pressure between a pressure at one site and a pressure at another site.

DISCLOSURE OF THE INVENTION

A first invention for attaining the above object is a self-operated regulating valve characterized in that one pressure introduced into one pressure transmission chamber, which is a space formed between a cylindrical valve body and one end surface of a spool formed axially movably in an internal space of the valve body, acts on the one end surface of the spool; other pressure introduced into other pressure transmission chamber, which is a space formed between the valve body and the other end surface of the spool, and a spring force of a preload spring acts on the other end surface of the spool; and a through-hole is provided in the spool, whereby when a difference between the one pressure and the other pressure exceeds a set value, the through-hole and pipe lines connected to the valve body communicate to bring the self-operated regulating valve into an open state, while when the difference does not exceed the set value, the through-hole and the pipe lines are cut off to bring the self-operated regulating valve into a closed state.

According to this invention, the valve can be opened or closed according to the differential pressure between the one pressure and the other pressure. Consequently, a simple-structured inexpensive valve can be supplied.

A second invention is a self-operated regulating valve characterized in that one pressure introduced into one pressure transmission chamber, which is a space formed between a cylindrical valve body and a flange portion provided midway through a spool, acts on the flange portion of the spool; other pressure introduced into other pressure transmission chamber, which is a space formed between the valve body and one end surface of the spool formed axially movably in an internal space of the valve body, acts on the one end surface of the spool; and the spool moves according to a differential pressure between the one pressure and the other pressure, whereby the other end surface of the spool closes or opens a region between opening ends of two pipe lines connected to the valve body.

According to this invention, like the first invention, the valve can be automatically opened or closed according to the differential pressure between the one pressure and the other pressure. At this time, the region between the opening ends of the two pipe lines connected to the valve body is closed or opened by the other end surface of the spool in accordance with the movement of the spool. Thus, sealability at this site can be maintained more satisfactorily. Consequently, a simple-structured inexpensive valve can be supplied, with sealability of the opening/closing portion being further improved.

A third invention is a self-operated regulating valve characterized in that a pressure of a fluid controlled by the self-operated regulating valve acts, as one pressure, on one end surface of a spool formed axially movably in an internal space of a cylindrical valve body; other pressure introduced into a pressure transmission chamber, which is a space formed between the valve body and the other end surface of the spool, and a spring force of a preload spring acts on the other end surface of the spool; and a through-hole is provided in the spool, whereby when a difference between the one pressure and the other pressure exceeds a set value, the through-hole and pipe lines connected to the valve body communicate to bring the self-operated regulating valve into an open state, while when the difference does not exceed the set value, the through-hole and the pipe lines are cut off to bring the self-operated regulating valve into a closed state.

According to this invention, the valve can be automatically opened or closed according to the differential pressure between the one pressure, the pressure of the fluid to be controlled, and the other pressure. Consequently, there can be supplied a valve of a simpler structure and at a lower price than the self-operated regulating valve described as the first invention.

A fourth invention is a multistage compression refrigerating machine having an inter-cooler, characterized in that the self-operated regulating valve described in the first invention or second invention is interposed midway through a pipe line for returning a refrigerant from the inter-cooler to a compressor; an internal pressure of a condenser is exerted as one pressure on the self-operated regulating valve, and an internal pressure of an evaporator is exerted as other pressure on the self-operated regulating valve, whereby when a differential pressure between the two pressures exceeds a set value, the self-operated regulating valve is brought into an open state.

According to this invention, the pressure of the inter-cooler can be adjusted to an appropriate value autonomously by a valve of a simple structure and at a low price.

A fifth invention is a compression refrigerating machine having a compressor configured such that a bulkhead separates a casing housing a drive motor of the compressor from a casing housing a speed increasing gear and impellers, sealing means is provided in a gap between a rotating shaft piercing through the bulkhead and the bulkhead so that a lubricating oil having lubricated the speed increasing gear does not enter the casing for the drive motor, a refrigerant gas is introduced into the casing for the drive motor to cool respective portions of the drive motor, and the refrigerant gas is then discharged from the casing, and characterized in that the self-operated regulating valve described in any one of the first to third inventions is interposed midway through a pipe line for discharging a cooling refrigerant from the casing for the drive motor, an internal pressure of the casing for the drive motor is exerted as one pressure on the self-operated regulating valve, and an internal pressure of the casing for the speed increasing gear is exerted as other pressure on the self-operated regulating valve, whereby when a differential pressure between the two pressures exceeds a set value, the self-operated regulating valve is brought into an open state.

According to this invention, the internal pressure of the casing for the drive motor can be adjusted autonomously to an appropriate value by a valve of a simple structure and at a low price, whereby entry of the lubricating oil from a gear chamber can be prevented.

A sixth invention is a compression refrigerating machine having a compressor configured such that a refrigerant gas is introduced into a casing of a drive motor of the compressor to cool respective portions of the drive motor, and then the refrigerant gas is discharged from the casing, and characterized in that the self-operated regulating valve described in any one of the first to third inventions is interposed midway through a pressure equalizing pipe line for equalizing a pressure on a refrigerant supply port side, where a cooling refrigerant is introduced, with a pressure on a refrigerant discharge port side, where the cooling refrigerant is discharged, within the casing of the drive motor, an internal pressure on the refrigerant supply port side of the casing is exerted as one pressure on the self-operated regulating valve, and an internal pressure on the refrigerant discharge port side of the casing is exerted as other pressure on the self-operated regulating valve, whereby when a differential pressure between the two pressures exceeds a set value, the self-operated regulating valve is brought into an open state.

According to this invention, the differential pressure between the internal pressure on the refrigerant supply port side of the casing of the drive motor and the internal pressure on the refrigerant discharge port side of the casing can be autonomously adjusted to an appropriate value by a valve of a simple structure and at a low price, whereby the cooling effect of the cooling refrigerant can be fully exhibited, and rotation load on the drive motor by the cooling refrigerant can be adjusted in an appropriate range.

A seventh invention is a compression refrigerating machine having a compressor configured such that a lubricating oil is stored in a casing, and the lubricating oil is circulated by an oil pump to lubricate rotary portions, and characterized in that the self-operated regulating valve described in the second invention is interposed midway through a pipe line leading from a condenser to the casing, an internal pressure of the casing is exerted as one pressure on the self-operated regulating valve, and an oil pressure of the lubricating oil is exerted as other pressure on the self-operated regulating valve, whereby when a differential pressure between the two pressures falls short of a set value, the self-operated regulating valve is brought into an open state.

In this invention, when the oil pump stops because of a power failure, supply of the lubricating oil by the oil pump is stopped, and the oil pressure of the oil pump, i.e., the other pressure, rapidly drops. Thus, the pressure difference from the pressure inside the casing, i.e., the one pressure, is less than the set value, opening the self-operated regulating valve. As a result, stoppage of the refrigerating machine due to the power failure results in the expansion of the liquid refrigerant in the condenser, followed by its introduction into the casing. Its pressure acts on a head tank in the casing. The pressure of the refrigerant introduced into the head tank replaces the function of the oil pump, and continues to supply the lubricating oil. Even if the supply of the lubricating oil is cut off, therefore, the lubricating oil can continue to be supplied to the rotary portions which continue rotating under an inertial force. Hence, a problem, such as seizure of the rotary portion, can be avoided.

An eighth invention is a compression refrigerating machine comprising a main refrigerant system and a lubrication system provided separately and independently, the main refrigerant system including a rotary compressor having rotary portions rotatably supported by a fluid bearing using a refrigerant liquid as a working fluid, and being configured such that a high temperature, high pressure refrigerant gas formed upon compression by the compressor is condensed by a condenser, then supplied to an evaporator for evaporation, and returned to the compressor as a refrigerant gas, and the lubrication system including a refrigerant tank for storing a refrigerant liquid, and a refrigerant pump, and being configured such that the refrigerant liquid pumped up by the refrigerant pump is fed to a bearing portion of the compressor and circulated, and characterized in that the self-operated regulating valve described in any one of the first to third inventions is interposed midway through a pipe line as a communication between a liquid reservoir of the condenser and a pipe line forming the lubrication system, an internal pressure of the liquid reservoir is exerted as one pressure on the self-operated regulating valve, and an internal pressure of the pipe line of the lubrication system is exerted as other pressure on the self-operated regulating valve, whereby when a differential pressure between the two pressures exceeds a set value, the self-operated regulating valve is brought into an open state.

According to this invention, even if the refrigerant pump breaks down to impede circulation of the refrigerant liquid through the refrigerant system, the refrigerant liquid can be supplied from the liquid reservoir to the lubrication system via the self-operated regulating valve. Thus, a problem, such as seizure of the bearing, can be avoided. Moreover, this effect can be produced by a simple-structured, inexpensive valve.

BEST MODE FOR CARRYING OUT THE INVENTION

Embodiments of the present invention will be described in detail based on the accompanying drawings.

<First Embodiment>

Figure 1:
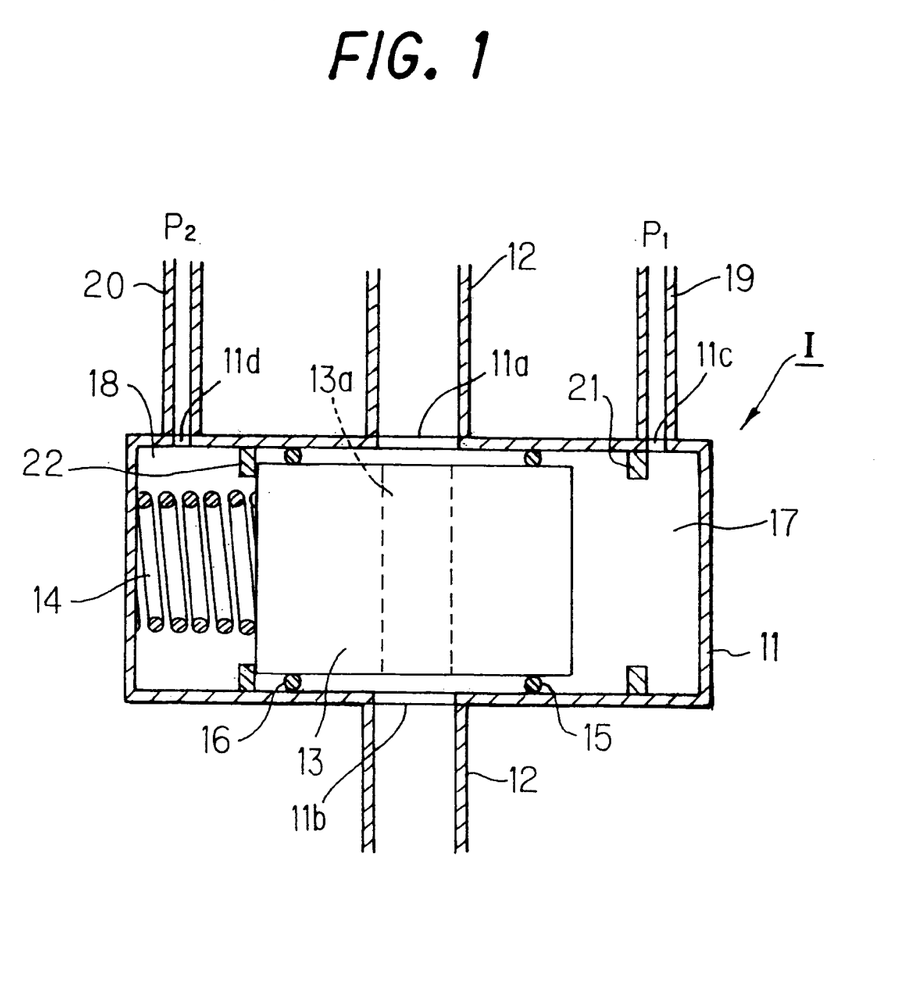
FIG. 1 is a structural drawing showing a self-operated regulating valve according to a first embodiment of the present invention.

FIG. 1 is a structural drawing showing a self-operated regulating valve according to a first embodiment of the present invention. As shown in the drawing, a valve body 11 of the self-operated regulating valve I forming a cylindrical closed space has an inlet 11a and an outlet 11b formed at opposed positions of a central portion thereof for incoming and outgoing of a fluid. In the inside space, a spool 13 is housed. The self-operated regulating valve I is connected to pipe lines 12 and 12, located above and below it in the drawing, via the inlet 11a and the outlet 11b. The spool 13 has a through-hole 13a opposed to the inlet 11a and the outlet 11b and serving as a passage for the fluid, and is slidable in the internal space of the valve body 11 in the right-and-left direction in the drawing along the axial direction. A predetermined preload is imposed on one end surface of the spool 13 by a preload spring 14. O rings 15, 16 are fitted on the outer peripheral surface at right and left end portions of the spool 13 to form two spaces between the respective end surfaces of the spool 13 and the respective end surfaces of the interior of the valve body 11. These respective spaces serve as pressure transmission chambers 17, 18, which accept one pressure $P_1$ and other pressure $P_2$ via pressure transmission pipes 19, 20 and pressure introduction holes 11c, 11d formed in the valve body 11. FIG. 1 shows a state in which a differential pressure $\Delta P$ between the one pressure $P_1$ and the other pressure $P_2$ is at a set value or higher to render the self-operated regulating valve I open. At this time, the left end surface of the spool 13 contacts a stopper 22 to have its position restrained. When the differential pressure $\Delta P$ decreases, by contrast, the spool 13 moves rightward in the drawing according to the amount of the decrease, and when its right end surface contacts a stopper 21, its position is restrained to stop the spool 13. As noted from this, at a time when the spool 13 contacts the stopper 21, the self-operated regulating valve I comes to a full-closed state. At a time when the spool 13 contacts the stopper 22, the self-operated regulating valve I comes to a full-open state.

<Second Embodiment>

Figure 2:
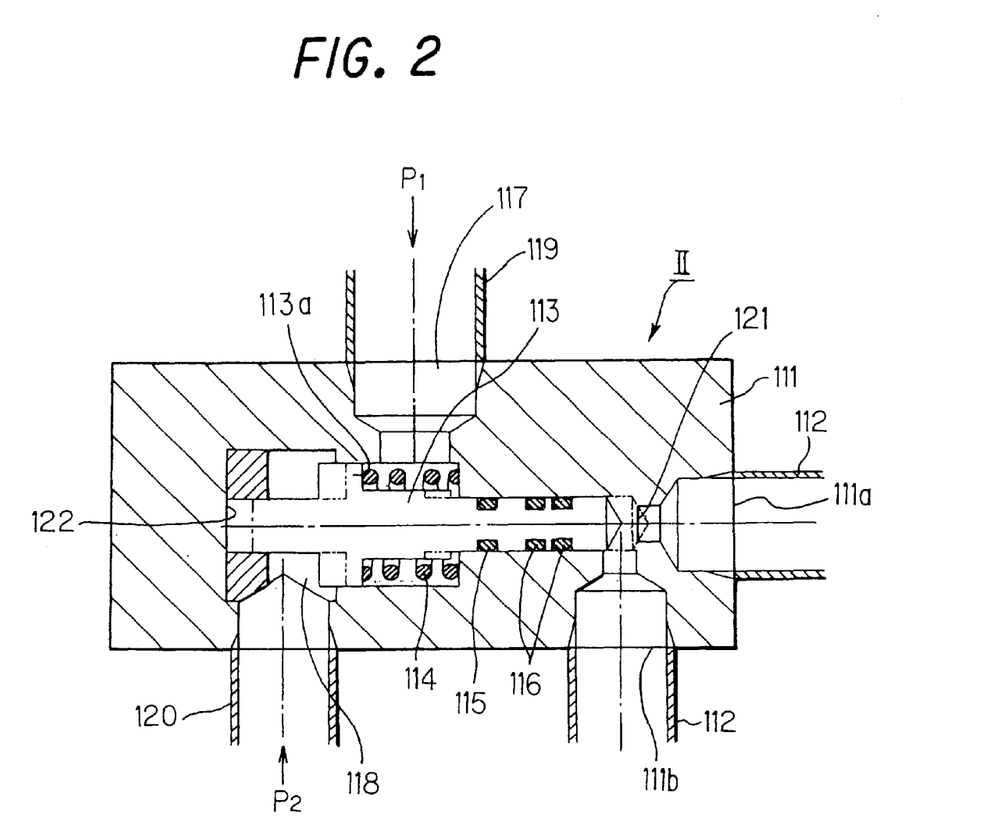
FIG. 2 is a structural drawing showing a self-operated regulating valve according to a second embodiment of the present invention.

FIG. 2 is a structural drawing showing a self-operated regulating valve according to a second embodiment of the present invention. As shown in the drawing, a self-operated regulating valve II is designed such that one pressure $P_1$ introduced into one pressure transmission chamber 117, a space formed between a tubular valve body 111 and a flange portion 113a provided midway through a spool 113, acts on the flange portion 113a. The spool 113 is movable axially in the internal space of the valve body 111. Another pressure transmission chamber 118 is a space formed between the valve body 111 and one end surface of the spool 113. Another pressure $P_2$ acts on the one end surface of the spool 113. A preload spring 114 is fitted on a portion of the spool 113 facing the pressure transmission chamber 117 to press the spool 113 constantly leftwardly in the drawing. Thus, in a normal situation, the spool 113 is moved leftward in the drawing by the spring force of the preload spring 114 (the position of the spool 113 at this time is indicated by solid lines in the drawing). When the other pressure $P_2$ is greater than the sum of the one pressure $P_1$ and the spring force of the preload spring 114, the spool 113 moves rightward in the drawing.

Pipe lines 112, 112 are connected to an inlet 111a and an outlet 111b provided in the valve body 111. As a result, the region between the inlet 111a and the outlet 111b is closed, with the spool 113 in contact with a right-hand stopper 121 in the drawing, to bring the region between the pipe lines 112 and 112 to a closed state. When the spool 113 contacts a left-hand stopper 122 in the drawing, the region between the inlet 111a and the outlet 111b is opened to bring the region between the pipe lines 112 and 112 to an open state. The one pressure $P_1$ is introduced into the pressure transmission chamber 117 via a pressure transmission pipe 119, and the other pressure $P_2$ is introduced into the pressure transmission chamber 118 via a pressure transmission pipe 120. The numerals 115 and 116 denote O rings.

With the above-described self-operated regulating valve II, when a differential pressure ΔP between the one pressure $P_1$ and the other pressure $P_2$ takes a set value or higher, the spool 113 falls into a state indicated by two-dot chain lines in FIG. 2. That is, the spool 113 contacts the stopper 121, bringing the self-operated regulating valve II to a full-closed state. On the other hand, when the differential pressure ΔP takes less than the set value, the spool 113 falls into a state indicated by solid lines in FIG. 2. That is, the spool 113 contacts the stopper 122, bringing the self-operated regulating valve II to a full-open state.

<Third Embodiment>

Figure 3:
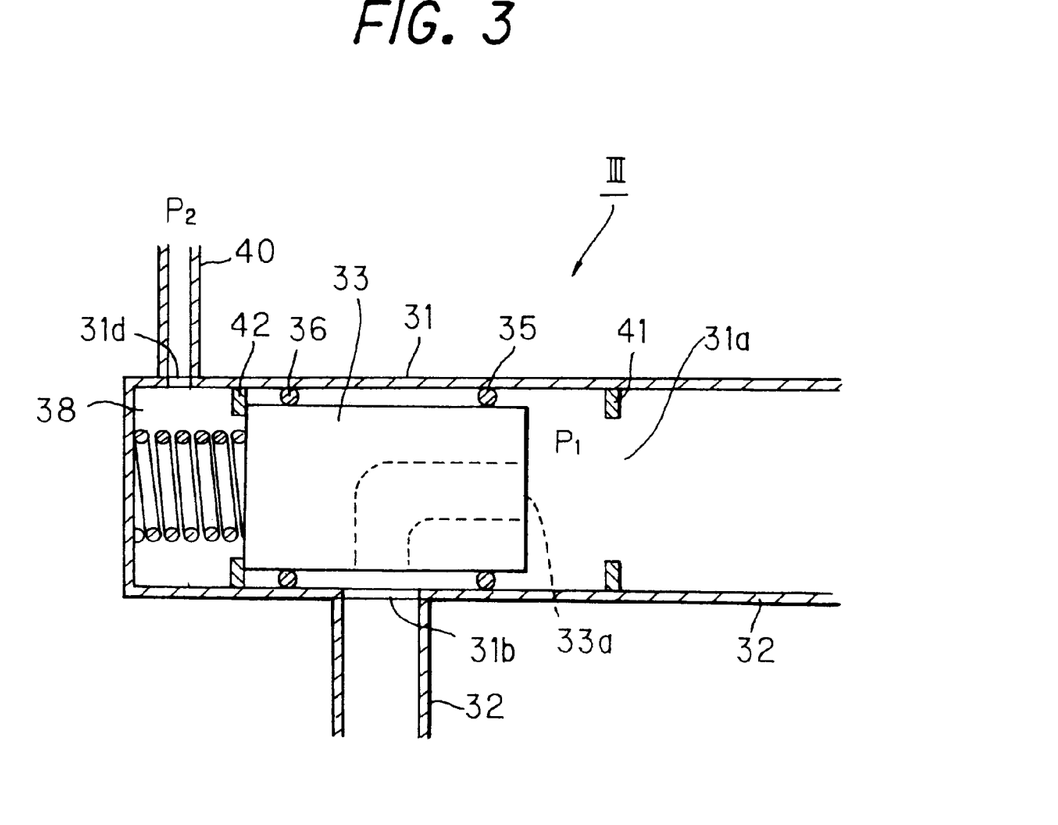
FIG. 3 is a structural drawing showing a self-operated regulating valve according to a third embodiment of the present invention.

FIG. 3 is a structural drawing showing a self-operated regulating valve according to a third embodiment of the present invention. A self-operated regulating valve III according to the present embodiment is useful when applied to a case in which one pressure $P_1$ guided to the pressure transmission chamber 17 of the self-operated regulating valve I shown in FIG. 1 can be obtained from the fluid flowed through the pipe line 12. This is because in such a case, the pressure of the fluid controlled is caused to act on one end surface of the spool, and this pressure of the fluid can be used as the one pressure $P_1$. Because of this feature, the configuration of the self-operated regulating valve III is further simplified.

As shown in FIG. 3, the self-operated regulating valve III according to the present embodiment, like the self-operated regulating valve I shown in FIG. 1, includes a valve body 31, a spool 33, a preload spring 34, a pressure transmission chamber 38, and a pressure transmission pipe 40. Of these members, the valve body 31 is integral with a pipe line 32 via a fluid inlet 31a present at one end portion of the valve body 31. An outlet 31b for the outflow of the fluid is formed in a central portion of the valve body 31, and another pipe line 32 is connected to the outlet 31b. In the internal space of the valve body 31, the spool 33 is housed. The spool 33 has an L-shaped through-hole 33a, which communicates with the inlet 31a and the outlet 31b and serves as a passage for the fluid, and the spool 33 is slidable in the internal space of the valve body 31 in the right-and-left direction in the drawing along the axial direction. A predetermined preload is imposed on the other end surface of the spool 33 by a preload spring 34. O rings 35, 36 are fitted on the outer peripheral surface at right and left end portions of the spool 33 to form a space between each end surface of the spool 33 and the other end surface of the interior of the valve body 31. This space serves as the pressure transmission chamber 38, which accepts other pressure $P_2$ via the pressure transmission pipe 40 and a pressure introduction hole 31d formed in the valve body 31.

FIG. 3 shows a state in which a differential pressure ΔP between the one pressure $P_1$ and the other pressure $P_2$ takes a set value or higher to render the self-operated regulating valve III open. At this time, the left end surface of the spool 33 contacts a stopper 42 to have its position restrained. When the differential pressure ΔP decreases, by contrast, the spool 33 moves rightward in the drawing according to the amount of the decrease. When its right end surface contacts a stopper 41, its position is restrained to produce a full-closed state and the spool 33 stops. As noted from this, at a time when the spool 33 contacts the stopper 41, the self-operated regulating valve III comes to a full-closed state. At a time when the spool 33 contacts the stopper 42, the self-operated regulating valve III comes to a full-open state.

The above-described self-operated regulating valves I, II and III may have various uses, and one of their preferred uses is as a turbo-refrigerating machine. Thus, turbo-refrigerating machines having the aforementioned self-operated regulating valves I, II and III will be described as fourth to eighth embodiments of the present invention.

<Fourth Embodiment>

Figure 4:
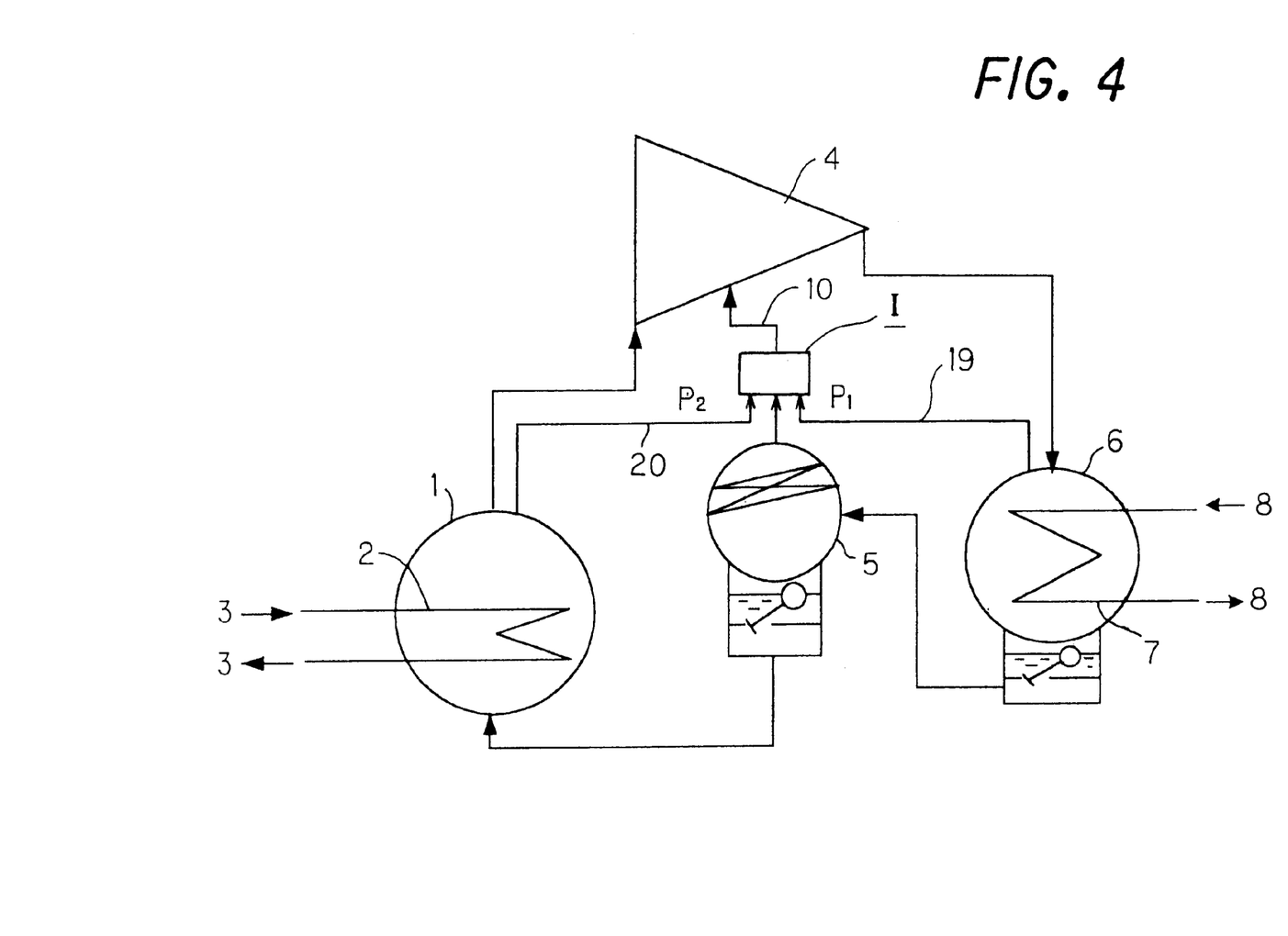
FIG. 4 is a system diagram showing a turbo-refrigerating machine according to a fourth embodiment of the present invention.

FIG. 4 is a system diagram showing a turbo-refrigerating machine according to a fourth embodiment of the present invention. This turbo-refrigerating machine has the self-operated regulating valve I incorporated instead of the intermediate suction valve 9 of the turbo-refrigerating machine shown in FIG. 9. Thus, the same portions as in FIG. 9 are assigned the same numerals, and duplicate explanations omitted. As shown in the drawing, the internal pressure of a condenser 6 is guided into a pressure transmission chamber 17 (see FIG. 1) via a pressure transmission pipe 19 as one pressure $P_1$ of the self-operated regulating valve I, while the internal pressure of an evaporator 1 is guided into a pressure transmission chamber (see FIG. 1) via a pressure transmission pipe 20 as other pressure $P_2$ of the self-operated regulating valve I. Thus, when $P_1-P_2>P_{ref1}$ (first set value), the self-operated regulating valve I opens, and supplies a refrigerant gas from an inter-cooler 5 to the second stage of a turbo-compressor 4 via a pipe line 10. When $P_1-P_2 \leq P_{ref1}$, on the other hand, the self-operated regulating valve I closes, and the supply of the refrigerant gas from the inter-cooler 5 to the turbo-compressor 4 is cut off. In the turbo-refrigerating machine, as noted above, two-stage compression is performed by supplying the refrigerant gas from the inter-cooler 5 to the turbo-compressor 4 on condition that a differential pressure ΔP between the one pressure $P_1$, which is the internal pressure of the condenser 6, and the other pressure $P_2$, which is the internal pressure of the evaporator 1, exceeds the first set value $P_{ref1}$.

<Fifth Embodiment>

Figure 5:
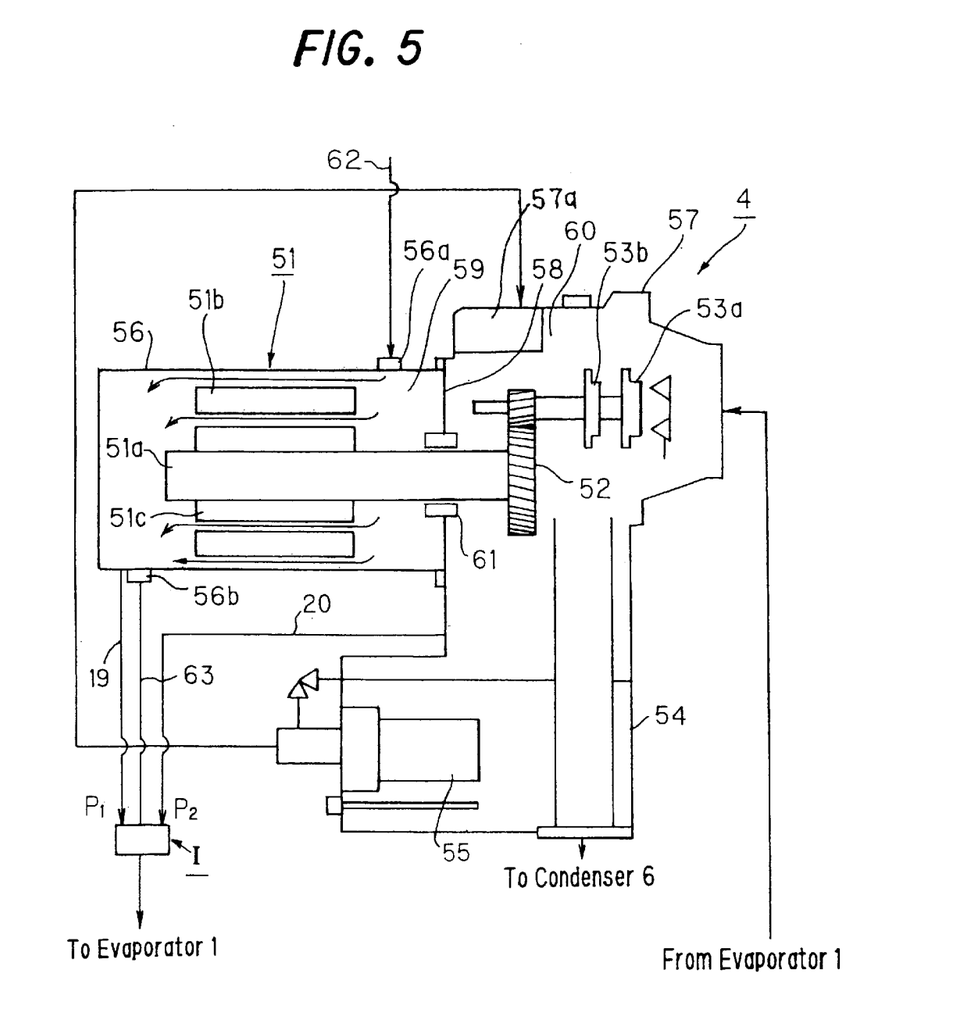
FIG. 5 is a system diagram showing a turbo-refrigerating machine according to a fifth embodiment of the present invention.

FIG. 5 is a view according to a fifth embodiment of the present invention. It is, for example, a structural drawing showing, in an extracted and enlarged form, the turbo-compressor 4 of the turbo-refrigerating machine shown in FIG. 4. As shown in the drawing, the turbo-compressor 4 is constituted such that a drive motor 51 rotates impellers 53a, 53b (in the case of two-stage compression) via a speed increasing gear 52, drawing in a refrigerant gas supplied from an evaporator 1 to compress it. A lubricating oil stored in an oil tank 54 is pumped up by an oil pump 55, and once accumulated in a head tank 57a within a casing 57. Then, the lubricating oil is supplied, in a proper amount at a time, from the head tank 57a to lubrication sites such as the speed increasing gear 52. The lubricating oil, which has lubricated the speed increasing gear 52, etc., returns to the oil tank 54. A casing 56 housing the drive motor 51, and the casing 57 housing the speed increasing gear 52 and the impellers 53a, 53b are separated from each other by a bulkhead 58 to form a motor chamber 59 and a gear chamber 60. This is intended to prevent the lubricating oil, supplied to the speed increasing gear 52, from entering the motor chamber 59. For this purpose, a seal 61 is provided between the bulkhead 61 and a rotating shaft 51a of the drive motor 51 piercing through the bulkhead 58 and facing the motor chamber 59 and the gear chamber 60. The seal 61 is normally formed from a gas seal or a floating seal, and the pressure of the motor chamber 59 is made slightly higher than the pressure of the gear chamber 60 in order to create a flow from the motor chamber 59 to the gear chamber 60.

On the other hand, the motor chamber 59 of this type of turbo-compressor 4 is in an atmosphere of a refrigerant gas so that the refrigerant gas is flowed between the casing 56 and a stator 51b of the drive motor 51, and between the stator 51b and a rotor 51c to cool the stator 51b and the rotor 51c. For this purpose, the casing 56 has a refrigerant supply port 56a and a refrigerant discharge port 56b provided on a right side and a left side thereof, with the stator 51b and the rotor 51c being sandwiched therebetween. A high pressure refrigerant gas flows in via a pipe line 62 and the refrigerant supply port 56a, cools the stator 51b and the rotor 51c, and then flows out via the refrigerant discharge port 56b toward an evaporator 1 (see FIG. 4), for example.

With this type of turbo-compressor, as described above, when the pressure of the motor chamber 59 is taken as one pressure $P_1$, and the pressure of the gear chamber 60 as other pressure $P_2$, it is necessary to establish the relationship $P_1-P_2>P_{ref2}$ (second set value). With an earlier technology, therefore, flow restricting means, such as an orifice, was put in a pipe line 63. In this case, however, once the amount of restriction is set, flow rate is fixed at this amount of restriction. Thus, a turbo-refrigerating machine following multi-point specifications, which has nonuniform set values for load and has to deal with various loads, in particular, has posed the problem that an orifice or the like has been unsuccessful.

According to the present embodiment, therefore, the self-operated regulating valve I is put in the pipe line 63, and the internal pressure of the motor chamber 59 is supplied into the pressure transmission chamber 17 (see FIG. 1) via the pressure transmission pipe 19 as the one pressure $P_1$ of the self-operated regulating valve I, while the internal pressure of the gear chamber 60 is supplied into the pressure transmission chamber 18 (see FIG. 1) via the pressure transmission pipe 20 as the other pressure $P_2$ of the self-operated regulating valve I.

Thus, according to the present embodiment, provided that $P_1-P_2>P_{ref1}$, the self-operated regulating valve I opens, discharging a refrigerant gas for cooling to the evaporator 1 (see FIG. 4) or the like. When $P_1-P_2 \leq P_{ref1}$, on the other hand, the self-operated regulating valve I closes, increasing the pressure inside the motor chamber 59 to prevent leakage of the lubricating oil from the gear chamber 60 to the motor chamber 59.

<Sixth Embodiment>

Figure 6:
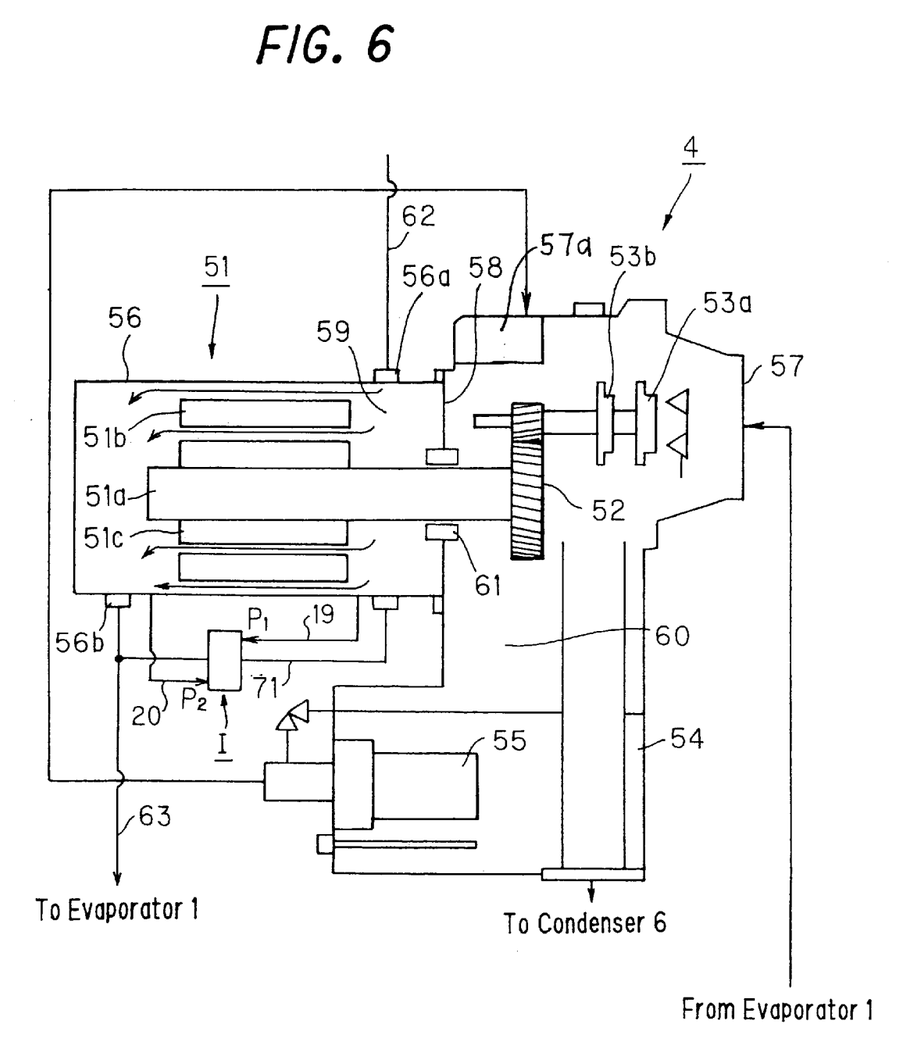
FIG. 6 is a system diagram showing a turbo-refrigerating machine according to a sixth embodiment of the present invention.

FIG. 6 is a view according to a sixth embodiment of the present invention. It is, for example, a structural drawing showing, in an extracted and enlarged form, the turbo-compressor 4 of the turbo-refrigerating machine shown in FIG. 4. The turbo-compressor 4 is of the same type as the turbo-compressor 4 shown in FIG. 5. Thus, the same portions as in FIG. 5 are assigned the same numerals, and duplicate explanations are omitted.

As shown in FIG. 6, a refrigerant gas for cooling is supplied to a motor chamber 59 through a refrigerant supply port 56a. As indicated by arrows in the drawing, the refrigerant gas flows between a casing 56 and a stator 51b, and between the stator 51b and a rotor 51c to cool the stator 51b and the rotor 51c. Then, the refrigerant gas is discharged, for example, to an evaporator 1 (see FIG. 4) via a refrigerant discharge port 56b. The flow rates of the refrigerant gas flowing between the casing 56 and the stator 51b, and between the stator 51b and the rotor 51c, are determined by the pressure difference between the portion of the motor chamber 59 beside the refrigerant support port 56a and its portion beside the refrigerant discharge port 56b. If this pressure difference is too great, the flow rate of the refrigerant gas increases to induce an increase in a loss of the drive motor 51. If it is too small, the flow rate of the refrigerant gas decreases, resulting in the failure to obtain a sufficient cooling effect. With an earlier technology, therefore, a pressure equalizing pipe line 71 is provided as a communication between the portion of the motor chamber 59 beside the refrigerant supply port 56a and its portion beside the refrigerant discharge port 56b, and an electromagnetic valve or the like is put in the pressure equalizing pipe line 71. The pressures of these different portions are detected, and if the difference between these pressures exceeds a set value, the above electromagnetic valve or the like is opened to bypass the refrigerant gas via the pressure equalizing pipe line 71. With such an earlier technology, however, there have been the problems that a sensor for pressure detection, and an expensive electromagnetic valve are required, the structure is complicated, and the cost has been boosted.

According to the present embodiment, therefore, the self-operated regulating valve I is put in a pipe line 63, and the internal pressure of the motor chamber 59 is supplied into the pressure transmission chamber 17 (see FIG. 1) via the pressure transmission pipe 19 as one pressure $P_1$ of the self-operated regulating valve I, while the internal pressure of the gear chamber 60 is supplied into the pressure transmission chamber 18 (see FIG. 1) via the pressure transmission pipe 20 as other pressure $P_2$ of the self-operated regulating valve I.

Thus, according to the present embodiment, provided that $P_1-P_2>P_{ref3}$ (third set value), the self-operated regulating valve I opens, bypassing the refrigerant gas present in the portion of the motor chamber 59 beside the refrigerant supply port 56a via the pressure equalizing pipe line 71. By so doing, the flow rate of the refrigerant gas cooling the stator 51b and the rotor 51c is restricted to limit an increase in the load imposed on the drive motor 51. When $P_1-P_2 \leq P_{ref1}$, on the other hand, the self-operated regulating valve I closes. Thus, all of the refrigerant gas supplied through the refrigerant supply port 56a is used for cooling the stator 51b and the rotor 51c, ensuring satisfactory cooling of the relevant portions.

<Seventh Embodiment>

Figure 7:
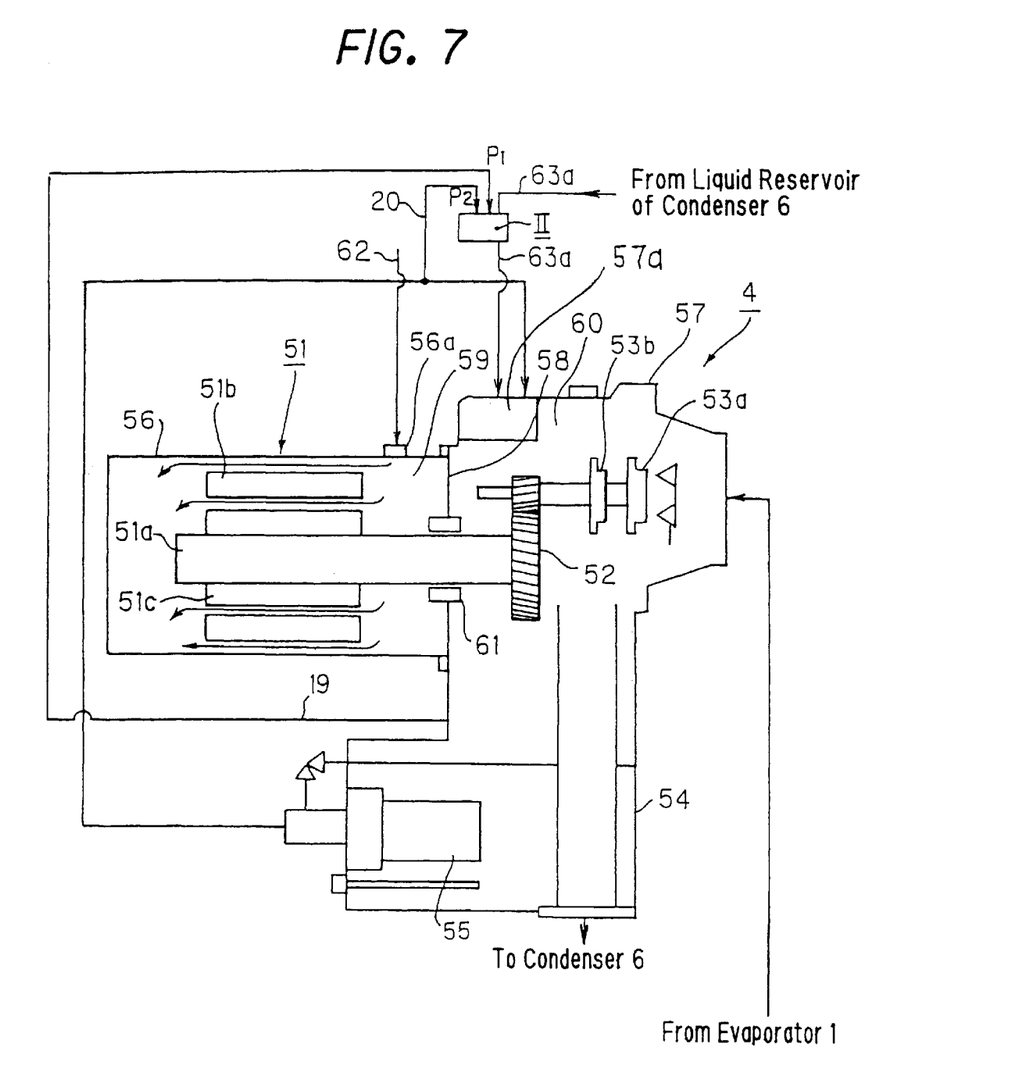
FIG. 7 is a system diagram showing a turbo-refrigerating machine according to a seventh embodiment of the present invention.

FIG. 7 is a view according to a seventh embodiment of the present invention. It is, for example, a structural drawing showing, in an extracted and enlarged form, the turbo-compressor 4 of the turbo-refrigerating machine shown in FIG. 4. The turbo-compressor 4 is of the same type as the turbo-compressor 4 shown in FIG. 5. Thus, the same portions as in FIG. 5 are assigned the same numerals, and duplicate explanations are omitted.

As shown in FIG. 7, a self-operated regulating valve II is disposed midway through a pipe line 63a ranging from a condenser 6 to a casing 57, and the internal pressure of the casing 57 is exerted via a pressure transmission pipe 19 as one pressure $P_1$ of the self-operated regulating valve II. The oil pressure of a lubricating oil, the discharge oil pressure of an oil pump 55, is exerted as other pressure $P_2$ of the self-operated regulating valve II. Thus, when a differential pressure $\Delta P$ between the two pressures $P_1$ and $P_2$ falls short of a set value, the self-operated regulating valve II comes into an open state. During normal operation of the turbo-refrigerating machine, the self-operated regulating valve II is in a closed state, because the other pressure $P_2$, the oil pressure of the lubricating oil, is sufficiently higher than the one pressure $P_1$, the pressure within the casing 57.

If the oil pump 55 stops because of a power failure or the like, the supply of the lubricating oil by the oil pump 55 is brought to a halt. As a result, the oil pressure of the oil pump 55, i.e., the pressure $P_2$, abruptly drops. Thus, the differential pressure relative to the pressure $P_1$ within the casing 57 exceeds the set value, opening the self-operated regulating valve II. That is, when $P_1-P_2>P_{ref4}$ (fourth set value), the self-operated regulating valve II opens, and a refrigerant is supplied from the condenser 6 via the pipe line 63a. As a result, the liquid refrigerant in the condenser 6, which has been expanded upon stoppage of the turbo-refrigerating machine due to the power failure, is introduced into a head tank 57a of the casing 57 to act on the lubricating oil stored in the head tank 57a. The pressure of the refrigerant introduced into the head tank 57a acts as a substitute for the function of the oil pump 55, and continues to supply the lubricating oil. Hence, even if the supply of the lubricating oil is stopped, the rotary portions kept rotating by an inertia force can continue to be supplied with the lubricating oil.

<Eighth Embodiment>

Turbo-compressors according to the earlier technologies, including the turbo-compressors related to the embodiments shown in FIGS. 5 to 7, have generally adopted a system in which rotations of a drive motor 51 (see FIGS. 5 to 7) are transmitted to impellers 53a, 53b (see FIGS. 5 to 7) via a speed increasing gear 52 (see FIGS. 5 to 7). In recent years, the supply of a high frequency electric power by an inverter has become possible. The inverter control has permitted high speed operation of the drive motor (especially, induction motor) 51. Consequently, predetermined high speed operation of the drive motor 51 has been achieved without the use of the speed increasing gear 52, and proposals have been made for a turbo-compressor which rotates the impellers 53a, 53b directly by the drive motor 51 (this type of turbo-compressor will be referred to hereinafter as a direct drive turbo-compressor).

Since such a direct drive turbo-compressor does not have the speed increasing gear 52, lubrication of this part is not necessary, and lubrication of only the liquid bearing portion of the drive motor 51 is sufficient. Thus, even a refrigerant liquid with a lower viscosity and a lower load-bearing ability than a lubricating oil can be sufficiently used as a lubricating liquid for the turbo-compressor.

Figure 8:
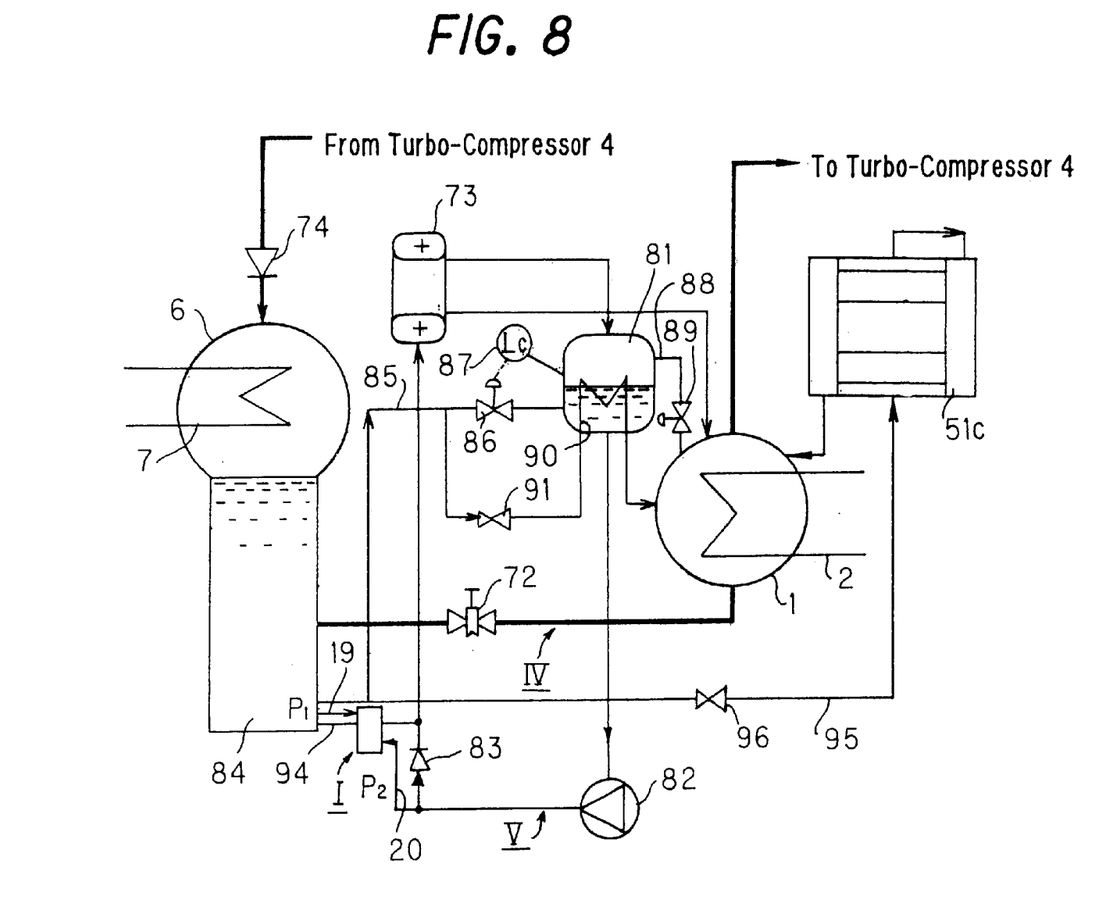
FIG. 8 is a system diagram showing a turbo-refrigerating machine according to an eighth embodiment of the present invention.

Under these circumstances, a turbo-refrigerating machine using a refrigerant liquid as a lubricating liquid for a turbo-compressor has been proposed. The application of the self-operated regulating valve I shown in FIG. 1 to this type of turbo-refrigerating machine is shown in FIG. 8 as an eighth embodiment of the present invention. This drawing is a system diagram showing a main portion of the turbo-refrigerating machine in an extracted form. The same portions as in FIGS. 4 to 7 are assigned the same numerals, and duplicate explanations are omitted.

As shown in FIG. 8, according to the turbo-refrigerating machine of the present embodiment, a high temperature, high pressure refrigerant gas supplied from a turbo-compressor 4 via a check valve 74 is condensed by a condenser 6 to form a refrigerant liquid. The refrigerant liquid is supplied to an evaporator 1 via an expansion valve 72 so that the refrigerant liquid is evaporated by the evaporator 1. A channel for this flow of the refrigerant is indicated by thick lines in the drawing as a main refrigerant system IV. A bearing 73 is a bearing for rotatably supporting a rotor 51c of the drive motor, and is formed by a liquid bearing. For this purpose, the bearing 73 needs to be supplied with a lubricating liquid. In the present embodiment, a lubrication system V is formed to utilize the refrigerant liquid as the lubricating liquid. That is, the lubrication system V is constituted such that the refrigerant liquid stored in a refrigerant tank 81 is pumped up by driving of a refrigerant pump 82, fed to the bearing 73 via a check valve 83, and then returned to the refrigerant tank 81. The lubrication system V forms a closed loop independent from the main refrigerant system IV.

In the lubrication system V, when the oil is fed to the bearing 73, the refrigerant liquid necessarily involves a leak, which needs to be compensated for. The amount corresponding to the leak of the refrigerant liquid associated with the lubrication of the bearing 73 is returned to the evaporator 1 with the lowest pressure in the turbo-refrigerating machine. Returning the leak amount to the evaporator 1 means returning the refrigerant liquid of the lubrication system V to the main refrigerant system IV, so that the corresponding amount of the refrigerant liquid has to be replenished. In the present embodiment, therefore, a liquid reservoir 84 of the condenser 6 and the interior of the refrigerant tank 81 communicate with each other by a pipe line 85, and a refrigerant replenishment valve 86 is provided midway through the pipe line 85. That is, when the refrigerant replenishment valve 86 is opened, the refrigerant liquid stored in the liquid reservoir 84 is flowed into the refrigerant tank 81 by the pressure acting thereon to perform its replenishment. Control for opening and closing the refrigerant replenishment valve 86 is performed by a level controller 87 for controlling the liquid level of the refrigerant liquid within the refrigerant tank 81.

When the refrigerant replenishment valve 86 is opened to replenish the refrigerant tank 81 with the refrigerant liquid, a refrigerant gas, an expanded form of the refrigerant liquid, is also incorporated into the refrigerant tank 81, together with the refrigerant liquid. That is, the refrigerant gas necessarily occurs to increase the gas pressure inside the refrigerant tank 81, so that the refrigerant gas needs to be removed. In the present embodiment, therefore, the interior of the refrigerant tank 81 and the interior of the evaporator 1 communicate with each other by a pipe line 88, and a communication valve 89 is provided midway through the pipe line 88.

When the refrigerant liquid is to be fed into the refrigerant tank 81 for replenishment, the refrigerant replenishment valve 86 is opened, and the communication valve 89 is opened with some delay, whereby the refrigerant liquid can be replenished, and the associated refrigerant gas can be discharged to the evaporator 1 via the communication valve 89. In other words, it is possible to replenish the interior of the refrigerant tank 81 with the refrigerant liquid while performing gas separation.

Since the refrigerant liquid fed to the bearing 73 has heat input, it partially gasifies. If the resulting gas is left untreated, the refrigerant gas increases within the refrigerant tank 81 to raise the internal pressure. To avoid this situation, the refrigerant gas inside the refrigerant tank 81 is condensed in the present embodiment. Concretely, a heat transfer pipe 90 is provided inside the refrigerant tank 81, and the refrigerant liquid from the condenser 6 is supplied to the heat transfer pipe 90 via a restrictor 91. By so doing, the interior of the refrigerant tank 81 is cooled to eliminate the heat input in the bearing 73. As a result, the refrigerant liquid can be circulated, with the pressure inside the refrigerant tank 81 being kept constant. The refrigerant liquid that has left the heat transfer pipe 90 is supplied to the evaporator 1.

The self-operated regulating valve I is provided midway through the pipe line 94 as a communication between the lubrication system V and the liquid reservoir 84 of the condenser 6, and comes into an open state when the refrigerant pump 82 stops because of a power failure or the like. That is, the refrigerant pump 82 stops during power failure, making it impossible to circulate the refrigerant liquid by the refrigerant pump 82. By contrast, the rotary portions of the turbo-compressor 4 keep rotating for awhile, because of their inertia, even after stoppage of the refrigerant pump 82. Thus, lubrication of the bearing 73 should be continued subsequently during inertial rotation of the rotary portions. According to the present embodiment, the internal pressure of the liquid reservoir 84 is supplied into the self-operated regulating valve I as one pressure $P_1$, while the pressure in the lubrication system V on the discharge side of the refrigerant pump 82 is supplied into the self-operated regulating valve I as other pressure $P_2$. Consequently, when the refrigerant pump 82 is normally operated, and the refrigerant liquid is normally circulated in the lubrication system V, $P_1 - P_2 \leq P_{refs}$, bringing the self-operated regulating valve I to a closed state. If the refrigerant pump 82 stops because of a power failure or the like, the other pressure $P_2$ abruptly drops. As a result, $P_1 - P_2 > P_{refs}$, and the self-operated regulating valve I opens. Thus, the refrigerant liquid in the liquid reservoir 84 is supplied to the lubrication system V via the pipe line 94. In this manner, even after stoppage of the refrigerant pump 82 due to power failure or the like, the refrigerant liquid can continue to be fed to the bearing 73 for a while. The supply of the refrigerant liquid on this occasion is carried out owing to the differential pressure between the condenser 6 and the lubrication system V.

In the present embodiment, moreover, the rotor 5c, etc. of the drive motor are cooled with the refrigerant gas. In more detail, a pipe line 95 is provided for supplying the refrigerant from the liquid reservoir 84 of the condenser 6 into the casing of the drive motor, and a restrictor 96 is provided midway through the pipe line 95. Thus, the refrigerant liquid flowing out of the liquid reservoir 84 adiabatically expands at the restrictor 96 to turn into a mist-containing saturated gas, which is supplied to the outer peripheral surface of the rotor 51c, cooling the rotor 51c. The refrigerant gas liquefies upon cooling of the rotor 51c to form a refrigerant liquid, which is discharged to the evaporator 1.

In the foregoing turbo-refrigerating machine according to the present embodiment, the lubrication system V is provided independently from the main refrigerant system IV. Thus, the lubrication system V is not affected by changes in the load imposed on the main refrigerant system IV, but permits circulation of the refrigerant liquid by the driving of the refrigerant pump 82 to feed the refrigerant liquid to the bearing 73. At this time, the refrigerant liquid undergoing heat input at the bearing 73 is cooled with the refrigerant gas flowing through the heat transfer pipe 90 to have its inputted heat removed. As a result, the refrigerant liquid is always maintained at a constant pressure which is higher than the pressure inside the evaporator 1 by a predetermined pressure $\alpha$. The refrigerant liquid at this constant pressure can continue to be fed to the bearing 73.

The level controller 85 detects the liquid level of the refrigerant liquid stored in the refrigerant tank 81, and when the liquid level is about to lower to a predetermined value or less, opens the refrigerant replenishment valve 86 to feed the refrigerant liquid for replenishment.

If the refrigerant pump 82 stops because of a power failure during operation of the turbo-refrigerating machine, or for other cause, the other pressure $P_2$ suddenly drops, resulting in $P_1 - P_2 > P_{refs}$, so that the self-operated regulating valve I opens. As a result, the lubrication system V communicates with the liquid reservoir 84 of the condenser 6 via the pipe line 94. Consequently, the lubrication system V continues supply of the refrigerant liquid in the lubrication system V for a while according to the differential pressure between the condenser 6 and the lubrication system V. Thus, feeding of the refrigerant liquid to the bearing 73 continues, preventing seizure at the bearing 73.

The turbo-refrigerating machines according to the above-described fourth to eighth embodiments use the self-operated regulating valve I or II individually in the respective portions. However, any of the turbo-refrigerating machines may use two or three of the self-operated regulating valves I or II in combination. That is, there may be a single turbo-refrigerating machine comprising a combination of the turbo-refrigerating machines according to the fourth to eighth embodiments, or a single turbo-refrigerating machine comprising a combination of any two of these turbo-refrigerating machines.

Furthermore, the turbo-refrigerating machines according to the fifth embodiment, the sixth embodiment and the eighth embodiment use the self-operated regulating valve I shown in FIG. 1, but needless to say, may use the self-operated regulating valve III shown in FIG. 3. That is, exactly the same actions and effects can be obtained in these embodiments even if the self-operated regulating valve I is replaced by the self-operated regulating valve III.

The fourth to eighth embodiments have been described as turbo-refrigerating machines, which are not restrictive. Compression refrigerating machines for compressing a refrigerant, for example, screw refrigerating machines, can be constituted in the same manner.

INDUSTRIAL APPLICABILITY

As described above, the self-operated regulating valve according to the present invention, and the compression refrigerating machine including it are useful, particularly when applied to compression refrigerating machines, such as a turbo-refrigerating machine and a screw refrigerating machine.

What is claimed is:

1. A self-operated regulating valve characterized in that
   one pressure introduced into one pressure transmission chamber, which is a space formed between a cylindrical valve body and one end surface of a spool formed axially movably in an internal space of the valve body, acts on the one end surface of the spool;
   other pressure introduced into other pressure transmission chamber, which is a space formed between the valve body and the other end surface of the spool, and a spring force of a preload spring act on the other end surface of the spool; and
   a through-hole is provided in the spool,
   whereby when a difference between the one pressure and the other pressure exceeds a set value, the through-hole and pipe lines connected to the valve body communicate to bring the self-operated regulating valve into an open state, while when the difference does not exceed the set value, the through-hole and the pipe lines are cut off to bring the self-operated regulating valve into a closed state.

2. A multistage compression refrigerating machine having an inter-cooler, characterized in that
   the self-operated regulating valve of claim 1 is interposed midway through a pipe line for returning a refrigerant from the inter-cooler to a compressor;
   an internal pressure of a condenser is exerted as one pressure on the self-operated regulating valve; and an internal pressure of an evaporator is exerted as other pressure on the self-operated regulating valve, whereby when a differential pressure between the two pressures exceeds a set value, the self-operated regulating valve is brought into an open state.

3. A compression refrigerating machine having a compressor configured such that a bulkhead separates a casing housing a drive motor of the compressor from a casing housing a speed increasing gear and impellers, sealing means is provided in a gap between a rotating shaft piercing through the bulkhead and the bulkhead so that a lubricating oil having lubricated the speed increasing gear does not enter the casing for the drive motor, a refrigerant gas is introduced into the casing for the drive motor to cool respective portions of the drive motor, and the refrigerant gas is then discharged from the casing, and characterized in that the self-operated regulating valve claimed in claim 1 is interposed midway through a pipe line for discharging a cooling refrigerant from the casing for the drive motor, an internal pressure of the casing for the drive motor is exerted as one pressure on the self-operated regulating valve, and an internal pressure of the casing for the speed increasing gear is exerted as other pressure on the self-operated regulating valve, whereby when a differential pressure between the two pressures exceeds a set value, the self-operated regulating valve is brought into an open state.

4. A compression refrigerating machine having a compressor configured such that a refrigerant gas is introduced into a casing of a drive motor of the compressor to cool respective portions of the drive motor, and then the refrigerant gas is discharged from the casing, and characterized in that the self-operated regulating valve claimed in claim 1 is interposed midway through a pressure equalizing pipe line for equalizing a pressure on a refrigerant supply port side, where a cooling refrigerant is introduced, with a pressure on a refrigerant discharge port side, where the cooling refrigerant is discharged, within the casing of the drive motor, an internal pressure on the refrigerant supply port side of the casing is exerted as one pressure on the self-operated regulating valve, and an internal pressure on the refrigerant discharge port side of the casing is exerted as other pressure on the self-operated regulating valve, whereby when a differential pressure between the two pressures exceeds a set value, the self-operated regulating valve is brought into an open state.

5. A compression refrigerating machine comprising a main refrigerant system and a lubrication system provided separately and independently, the main refrigerant system including a rotary compressor having rotary portions rotatably supported by a fluid bearing using a refrigerant liquid as a working fluid, and being configured such that a high temperature, high pressure refrigerant gas formed upon compression by the compressor is condensed by a condenser, then supplied to an evaporator for evaporation, and returned to the compressor as a refrigerant gas, and the lubrication system including a refrigerant tank for storing a refrigerant liquid, and a refrigerant pump, and being configured such that the refrigerant liquid pumped up by the refrigerant pump is fed to a bearing portion of the compressor and circulated, and characterized in that the self-operated regulating valve claimed in claim 1 is interposed midway through a pipe line as a communication between a liquid reservoir of the condenser and a pipe line forming the lubrication system, an internal pressure of the liquid reservoir is exerted as one pressure on the self-operated regulating valve, and an internal pressure of the pipe line of the lubrication system is exerted as other pressure on the self-operated regulating valve, whereby when a differential pressure between the two pressures exceeds a set value, the self-operated regulating valve is brought into an open state.

6. A self-operated regulating valve characterized in that a pressure of a fluid controlled by the self-operated regulating valve acts, as one pressure, on one end surface of a spool formed axially movably in an internal space of a cylindrical valve body;

other pressure introduced into a pressure transmission chamber, which is a space formed between the valve body and the other end surface of the spool, and a spring force of a preload spring act on the other end surface of the spool; and a through-hole is provided in the spool, whereby when a difference between the one pressure and the other pressure exceeds a set value, the through-hole and pipe lines connected to the valve body communicate to bring the self-operated regulating valve into an open state, while when the difference does not exceed the set value, the through-hole and the pipe lines are cut off to bring the self-operated regulating valve into a closed state.

7. A compression refrigerating machine having a compressor configured such that a bulkhead separates a casing housing a drive motor of the compressor from a casing housing a speed increasing gear and impellers, sealing means is provided in a gap between a rotating shaft piercing through the bulkhead and the bulkhead so that a lubricating oil having lubricated the speed increasing gear does not enter the casing for the drive motor, a refrigerant gas is introduced into the casing for the drive motor to cool respective portions of the drive motor, and the refrigerant gas is then discharged from the casing, and characterized in that the self-operated regulating valve claimed in claim 3 is interposed midway through a pipe line for discharging a cooling refrigerant from the casing for the drive motor, an internal pressure of the casing for the drive motor is exerted as one pressure on the self-operated regulating valve, and an internal pressure of the casing for the speed increasing gear is exerted as other pressure on the self-operated regulating valve, whereby when a differential pressure between the two pressures exceeds a set value, the self-operated regulating valve is brought into an open state.

8. A compression refrigerating machine having a compressor configured such that
   a refrigerant gas is introduced into a casing of a drive motor of the compressor to cool respective portions of the drive motor, and
   then the refrigerant gas is discharged from the casing, and characterized in that
      the self-operated regulating valve claimed in claim 3 is interposed midway through a pressure equalizing pipe line for equalizing a pressure on a refrigerant supply port side, where a cooling refrigerant is introduced, with a pressure on a refrigerant discharge port side, where the cooling refrigerant is discharged, within the casing of the drive motor,
      an internal pressure on the refrigerant supply port side of the casing is exerted as one pressure on the self-operated regulating valve, and
      an internal pressure on the refrigerant discharge port side of the casing is exerted as other pressure on the self-operated regulating valve,
   whereby when a differential pressure between the two pressures exceeds a set value, the self-operated regulating valve is brought into an open state.

9. A compression refrigerating machine comprising a main refrigerant system and a lubrication system provided separately and independently,
   the main refrigerant system including a rotary compressor having rotary portions rotatably supported by a fluid bearing using a refrigerant liquid as a working fluid, and being configured such that a high temperature, high pressure refrigerant gas formed upon compression by the compressor is condensed by a condenser, then supplied to an evaporator for evaporation, and returned to the compressor as a refrigerant gas, and
   the lubrication system including a refrigerant tank for storing a refrigerant liquid, and a refrigerant pump, and being configured such that the refrigerant liquid pumped up by the refrigerant pump is fed to a bearing portion of the compressor and circulated, and characterized in that
      the self-operated regulating valve claimed in claim 3 is interposed midway through a pipe line as a communication between a liquid reservoir of the condenser and a pipe line forming the lubrication system, an internal pressure of the liquid reservoir is exerted as one pressure on the self-operated regulating valve, and
      an internal pressure of the pipe line of the lubrication system is exerted as other pressure on the self-operated regulating valve,
   whereby when a differential pressure between the two pressures exceeds a set value, the self-operated regulating valve is brought into an open state.

10. A compression refrigerating machine having a compressor configured such that
    a refrigerant gas is introduced into a casing of a drive motor of the compressor to cool respective portions of the drive motor, and
    then the refrigerant gas is discharged from the casing, and characterized in that
       a self-operated regulating valve is provided that is characterized in that one pressure introduced into one pressure transmission chamber, which is a space formed between a cylindrical valve body and a flange portion provided midway through a spool, acts on the flange portion of the spool; other pressure introduced into other pressure transmission chamber, which is a space formed between the valve body and one end surface of the spool formed axially movably in an internal space of the valve body, acts on the one end surface of the spool; and the spool moves according to a differential pressure between the one pressure and the other pressure, whereby the other end surface of the spool closes or opens a region between opening ends of two pipe lines connected to the valve body, the self-operated regulating valve is interposed midway through a pressure equalizing pipe line for equalizing a pressure on a refrigerant supply port side, where a cooling refrigerant is introduced, with a pressure on a refrigerant discharge port side, where the cooling refrigerant is discharged, within the casing of the drive motor,
       an internal pressure on the refrigerant supply port side of the casing is exerted as one pressure on the self-operated regulating valve, and
       an internal pressure on the refrigerant discharge port side of the casing is exerted as other pressure on the self-operated regulating valve,
    whereby when a differential pressure between the two pressures exceeds a set value, the self-operated regulating valve is brought into an open state.

* * * * *